United States Patent
Claesson et al.

(10) Patent No.: US 11,839,782 B2
(45) Date of Patent: Dec. 12, 2023

(54) SAFETY METHOD AND CONTROL DEVICE FOR AN EMERGENCY VEHICLE

(71) Applicant: Scania CV AB, Södertälje (SE)

(72) Inventors: André Claesson, Tullinge (SE); Robert Sjödin, Nyköping (SE); Linus Ährlig, Västerhaninge (SE); Sami Teppola, Nykvarn (SE); Tomas Skeppström, Södertälje (SE); Mikko Kallio, Hölö (SE); Morgan Colling, Hölö (SE)

(73) Assignee: Scania CV AB, Södertälje (SE)

( * ) Notice: Subject to any disclaimer, the term of this patent is extended or adjusted under 35 U.S.C. 154(b) by 251 days.

(21) Appl. No.: 17/413,122

(22) PCT Filed: Oct. 30, 2019

(86) PCT No.: PCT/SE2019/051090
§ 371 (c)(1),
(2) Date: Jun. 11, 2021

(87) PCT Pub. No.: WO2020/130903
PCT Pub. Date: Jun. 25, 2020

(65) Prior Publication Data
US 2022/0040514 A1    Feb. 10, 2022

(30) Foreign Application Priority Data
Dec. 19, 2018 (SE) .................... 1851610-4

(51) Int. Cl.
*B60W 60/00* (2020.01)
*B25J 11/00* (2006.01)
(Continued)

(52) U.S. Cl.
CPC ............... *A62C 27/00* (2013.01); *B25J 11/00* (2013.01); *B60P 3/30* (2013.01); *B60W 60/0025* (2020.02); *E01H 1/108* (2013.01)

(58) Field of Classification Search
CPC ........ B25J 11/00; B60P 3/30; B60W 60/0025; E01H 1/108
See application file for complete search history.

(56) References Cited

U.S. PATENT DOCUMENTS 3,493,053 A    2/1970   Pendered
7,766,090 B2 * 8/2010   Mohr ..................... A62C 27/00
                                                         169/70
(Continued)

FOREIGN PATENT DOCUMENTS

CN    104338268 A    2/2015
CN    105088014 A    11/2015
(Continued)

OTHER PUBLICATIONS

"Robot World", p. 117, Wang Jianguo, Anhui Normal University Press, Jan. 1, 2012.
(Continued)

Primary Examiner — Kira Nguyen
(74) Attorney, Agent, or Firm — Moore & Van Allen PLLC; W. Kevin Ransom

(57) ABSTRACT

The invention relates to a safety method for an emergency vehicle, the emergency vehicle being configured to be autonomously operated and comprising: an energy storage unit; sensor devices arranged to monitor the surroundings and the vehicle; a water pump; at least one connection unit for an external water source and/or a water hose; conduits arranged in fluid communication with the water pump and/or the at least one connection unit; a valve arrangement arranged in fluid communication with the water pump, the at least one connection unit and the conduits, the method comprising: receiving a command from a control center to operate the vehicle to a location associated with an emergency situation; operating the vehicle to the location; and
(Continued)

controlling the vehicle to perform a safety function to alleviate the emergency situation.

32 Claims, 5 Drawing Sheets

(51) Int. Cl.
*A62C 27/00* (2006.01)
*B60P 3/30* (2006.01)
*E01H 1/10* (2006.01)

(56) References Cited

U.S. PATENT DOCUMENTS

| | | | |
|---|---|---|---|
| 9,802,661 | B1 | 10/2017 | Kentley-Klay |
| 2005/0077057 | A1 | 4/2005 | Askaris |
| 2009/0255331 | A1* | 10/2009 | Weis .............. F04D 15/0088 73/168 |
| 2011/0094761 | A1 | 4/2011 | Bollens |
| 2012/0185129 | A1* | 7/2012 | Carrier ............ B62D 53/005 180/24.07 |
| 2013/0061957 | A1* | 3/2013 | Hapner ............ F16L 55/12 137/527 |
| 2016/0304244 | A1* | 10/2016 | Nankervis ........ B65D 21/086 |
| 2017/0016448 | A1* | 1/2017 | Younker .......... F16H 55/56 |
| 2017/0348556 | A1 | 12/2017 | Neal et al. |

FOREIGN PATENT DOCUMENTS

| | | |
|---|---|---|
| CN | 106730529 A | 5/2017 |
| CN | 207024439 U | 2/2018 |
| CN | 207221150 U | 4/2018 |
| CN | 207356427 U | 5/2018 |
| CN | 108704232 A | 10/2018 |
| CN | 108815754 A | 11/2018 |
| EP | 2082784 A1 | 7/2009 |
| JP | H09271529 A | 10/1997 |
| WO | 2018222375 A1 | 12/2018 |
| WO | 2018223184 A1 | 12/2018 |

OTHER PUBLICATIONS

"Foundation of Modern Science and Technology", p. 559, Zhou Guangzhao, Mass Press, Jan. 2001.
"Equipment Technician Training Course", pp. 430-434, Fire Department of Ministry of Public Security, Mass press, Jan. 2012.
Scania CV AB, Chinese Patent Application No. 201980075970.9, First Office Action, dated Dec. 3, 2021.
Scania CV AB, International Patent Application No. PCT/SE2019/051090, International Preliminary Report on Patentability, dated Jun. 16, 2021.
Scania CV AB, European Patent Application No. 19901017.4, Extended European Search Report, dated Jul. 22, 2022.
Scania CV AB, International Patent Application No. PCT/SE2019/051090, International Search Report, dated Dec. 18, 2019.
Scania CV AB, International Patent Application No. PCT/SE2019/051090, Written Opinion, dated Dec. 18, 2019.
Scania CV AB, Swedish Patent Application No. 1851610-4, Office Action, dated Jul. 10, 2019.
Scania CV AB, Brazilian Patent Application No. BR112021009751-1, Preliminary Office Action, dated Aug. 15, 2023.

* cited by examiner

SAFETY METHOD AND CONTROL DEVICE FOR AN EMERGENCY VEHICLE

CROSS-REFERENCE TO RELATED APPLICATIONS

This application is a National Stage Patent Application (filed under 35 § U.S.C. 371) of PCT/SE2019/051090, filed Oct. 30, 2019 of the same title, which, in turn claims priority to Swedish Patent Application No. 1851610-4 filed Dec. 19, 2018 of the same title; the contents of each of which are hereby incorporated by reference.

FIELD OF THE INVENTION

The present invention relates to a safety method performed by a control device of an emergency vehicle. More specifically the present invention relates to a method for alleviating an emergency situation. The present invention also relates to a control device, a vehicle, a computer program, and a computer-readable medium.

BACKGROUND OF THE INVENTION

When an emergency situation, such as a fire, occurs it is crucial that emergency vehicles (fire trucks/fire engines) arrive at the scene as quickly as possible. Normally, the fire truck comprises a water tank on board, but the amount of water contained in such water tank may not be sufficient to extinguish a large fire. The fire truck or a water hose may then be connected to a fire hydrant to access an unlimited amount of water. Finding and connecting with such a fire hydrant may take time. Time, which could be spent on saving lives instead. In the event that the fire hydrant is located at a far distance from the actual fire, special vehicles configured for transporting water from a water source to a fire scene may have to be used. This may complicate the work of the rescue workers.

Also, depending on the severity of the emergency situation, it may be more or less risky for the rescue workers. For example, in the event that there is a risk for exploding objects inside a burning building, it may not even be possible to get close enough to the building to extinguish the fire.

SUMMARY OF THE INVENTION

Despite known solutions in the field, it would be desirable to achieve a safety method for an emergency vehicle, which solves or at least alleviates at least some of the drawbacks of the prior art.

An object of the present invention is therefore to achieve a new and advantageous safety method for an emergency vehicle, which method facilitates safety actions with regard to an emergency situation. Another object of the present invention is to achieve a new and advantageous safety method for an emergency vehicle, which method enables safety actions in a time-efficient and safe manner. Another object of the invention is to achieve a new and advantageous control device, vehicle, computer program and computer-readable medium.

The herein mentioned objects are achieved by a safety method, a control device, a vehicle, a computer program, and a computer-readable medium according to the independent claims.

Hence, according to an aspect of the present invention a safety method, performed by a control device of an emergency vehicle is provided. The emergency vehicle is configured to be autonomously operated by means of the control device and comprises: an energy storage unit arranged to supply power for propulsion of the vehicle and/or for performing safety functions; sensor devices arranged to monitor the surroundings and the vehicle; a water pump; at least one connection unit for an external water source and/or a water hose; conduits arranged in fluid communication with the water pump and/or the at least one connection unit; a valve arrangement arranged in fluid communication with the water pump, the at least one connection unit and the conduits; wherein the valve arrangement is configured to regulate the flow and/or pressure in the conduits and the at least one connection unit. The method comprises: receiving a command from a control center to operate the vehicle to a location associated with an occurring emergency situation; operating the vehicle to the location; and controlling the vehicle to perform a safety function to alleviate the emergency situation.

According to another aspect of the invention, a control device of an emergency vehicle is provided. The emergency vehicle is configured to be autonomously operated by means of the control device and comprising: an energy storage unit arranged to supply power for propulsion of the vehicle and/or for performing safety functions; sensor devices arranged to monitor the surroundings and the vehicle; a water pump; at least one connection unit for an external water source and/or a water hose; conduits arranged in fluid communication with the water pump and/or the at least one connection unit; a valve arrangement arranged in fluid communication with the water pump, the at least one connection unit and the conduits; wherein the valve arrangement is configured to regulate the flow and/or pressure in the conduits and the at least one connection unit, the control device being configured to: receive a command from a control center to operate the vehicle to a location associated with an occurring emergency situation; operate the vehicle to the location; and control the vehicle to perform a safety function to alleviate the emergency situation.

According to yet another aspect of the invention an emergency vehicle is provided. The vehicle is configured to be autonomously operated and comprises: an energy storage unit arranged to supply power for propulsion of the vehicle and/or for performing safety functions; sensor devices arranged to monitor the surroundings and the vehicle; a water pump; at least one connection unit for an external water source and/or a water hose; conduits arranged in fluid communication with the water pump and/or the at least one connection unit; and a valve arrangement arranged in fluid communication with the water pump, the at least one connection unit and the conduits; wherein the valve arrangement is configured to regulate the flow of water and/or pressure in the conduits and the at least one connection unit, the vehicle further comprising a control device as disclosed herein.

When an emergency situation occurs, time is a crucial factor. With focus on the emergency situation and perhaps on saving lives, it is also important to ensure the safety of the rescue workers. By using an autonomously operated emergency vehicle according to the invention, the vehicle can, for example, find and connect with a fire hydrant in a time-efficient way, allowing the rescue workers to focus on the fire scene and saving lives. Also, an autonomously operated vehicle can be operated very close to a fire despite the tremendous heat and dangerous smoke. This way, the work of extinguishing a fire is facilitated. Another example where an autonomously operated emergency vehicle is advantageous is when there is a risk for explosions at a fire scene. The autonomous emergency vehicle may be operated closer to the fire scene despite the risk. Thus, emergency situations, which are normally too risky for rescue workers may be alleviated by means of the emergency vehicle according to the invention. Safety is thereby increased. Furthermore, the autonomous emergency vehicle comprising a water pump means that the vehicle can function as a fire truck supplying water and the emergency vehicle can also be used to draft water from, for example, a flooded area. Furthermore, the emergency vehicle can be used to first draft water from a pond, pool or similar, and then transport the water to a fire scene.

Further objects, advantages and novel features of the present invention will become apparent to one skilled in the art from the following details, and also by putting the invention into practice. Whereas examples of the invention are described below, it should be noted that it is not restricted to the specific details described. Specialists having access to the teachings herein will recognise further applications, modifications and incorporations within other fields, which are within the scope of the invention.

BRIEF DESCRIPTION OF THE DRAWINGS

For fuller understanding of the present invention and further objects and advantages of it, the detailed description set out below should be read together with the accompanying drawings, in which the same reference notations denote similar items in the various diagrams, and in which.

DETAILED DESCRIPTION OF THE INVENTION

Figure 1:
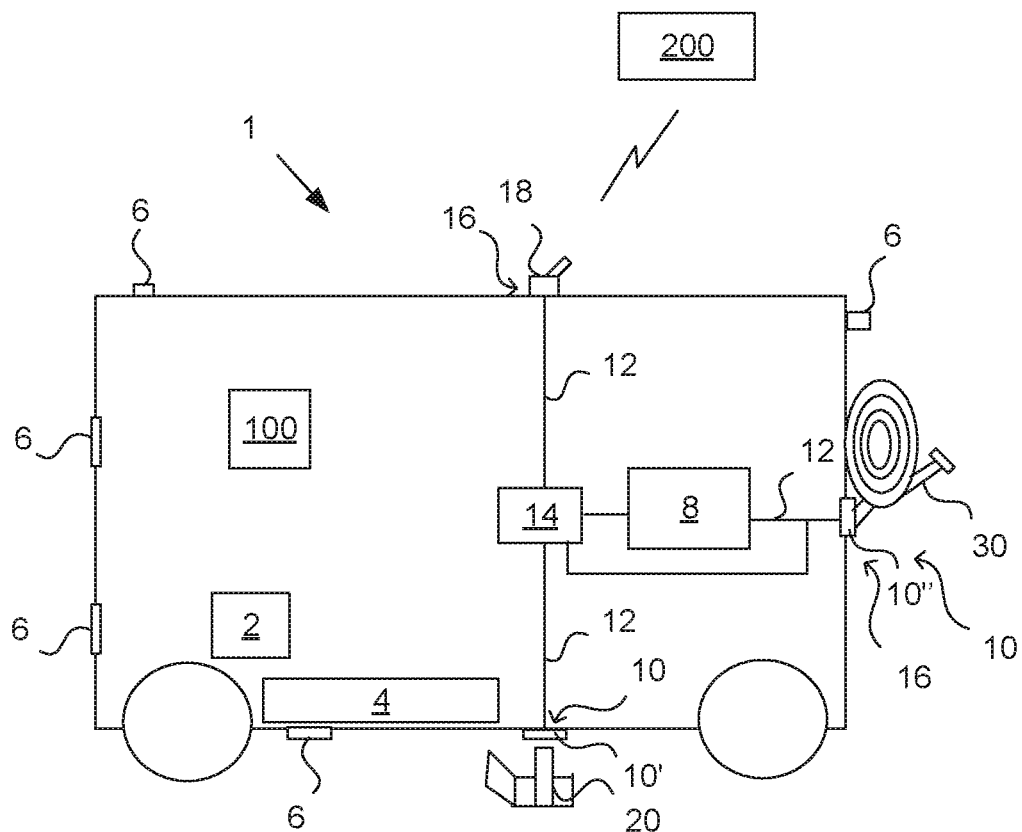
FIG. 1 schematically illustrates an emergency vehicle according to an example.

To increase safety and handle emergency situations in a more efficient way, a safety method and an emergency vehicle according to the disclosure has been developed. The present disclosure is applicable on all sorts of road vehicles. However, the disclosure may relate to heavy vehicles, such as buses, trucks etc. Specifically, the present disclosure may relate to modular vehicles for use on public roads.

According to an aspect of the present disclosure a safety method, performed by a control device of an emergency vehicle is provided. The emergency vehicle is configured to be autonomously operated by means of the control device and comprises: an energy storage unit arranged to supply power for propulsion of the vehicle and/or for performing safety functions; sensor devices arranged to monitor the surroundings and the vehicle; a water pump; at least one connection unit for an external water source and/or a water hose; conduits arranged in fluid communication with the water pump and/or the at least one connection unit; a valve arrangement arranged in fluid communication with the water pump, the at least one connection unit and the conduits; wherein the valve arrangement is configured to regulate the flow and/or pressure in the conduits and the at least one connection unit. The method comprises: receiving a command from a control center to operate the vehicle to a location associated with an occurring emergency situation; operating the vehicle to the location; and controlling the vehicle to perform a safety function to alleviate the emergency situation.

The valve arrangement comprises electric solenoids for control of water flow and pressure in all conduits, hoses and connection units. The control device is arranged in communication with the valve arrangement and controls the valve arrangement to provide the water pressure/flow that is necessary/required. The sensor devices may comprise ultrasonic sensors, Lidar, cameras, radar, laser, RFID readers and similar. By means of such sensor devices, the emergency vehicle can be operated with high precision.

It is to be understood that the control device performing the disclosed method may be implemented as a separate entity or distributed in two or more physical entities. The control device may comprise one or more control units and/or computers. The control device may thus be implemented or realized by the control device comprising a processor and a memory, the memory comprising instructions, which when executed by the processor causes the control device to perform the herein disclosed method steps. The control device is comprised in the vehicle and may be configured to operate the vehicle autonomously. The control device may thus be configured to transmit control signals to the various systems and components of the vehicle for controlling for example the steering and the propulsion of the vehicle. The control device may thereby be adapted to operate the vehicle autonomously based on received commands from the control center, and based on sensor input regarding its surroundings and positioning. The control device may thus be configured to receive commands from a remotely located control center and to convert the command into control signals for controlling the various systems and components of the vehicle. The control device may be configured to receive data about the surroundings from various sensor devices, and based on this data control the vehicle. The control device may further be configured to receive control signals from a remotely located operator using a remote control, such as a joystick or similar, and based on these control signals control the systems and components of the vehicle.

The control center may be referred to as an off-board system. The control center may be geographically on a distance from the vehicle. The control center may be implemented as a separate entity or distributed in two or more physical entities. The control center may comprise one or more computers configured to communicate with the control device of the vehicle. The control center may be configured to assign the emergency vehicle different missions. The command from the control center may comprise information about the emergency situation, so that the emergency vehicle knows which safety functions will be relevant to perform before reaching the location of the emergency situation.

According to an example, when the emergency situation relates to a flood, the step of controlling the vehicle to perform a safety function comprises controlling the valve arrangement and the water pump to suck water from the flood via a water hose connected to the at least one connection unit. The command from the control center may comprise information about the emergency situation relating to a flood. The control device may receive a command from the control center to suck water. The method may comprise verifying that a water hose is connected to the at least one connection unit before controlling the valve arrangement and the water pump to suck water. Verifying that a water hose is connected to the at least one connection unit may comprise receiving signals from a sensor arranged at the at least one connection unit. The sensor may be configured to determine when a water hose is connected to the at least one connection unit. Suitably, the sensor will send a signal to the control device indicating correct connection between the water hose and the at least one connection unit. The control device may transmit information to the control center that a water hose is connected to the at least one connection unit. The control device may then, based on a received command from the control center, control the valve arrangement and the water pump to initiate suction of water.

Controlling the vehicle to perform a safety function may further comprise controlling the valve arrangement to collect the sucked water in a tank on the vehicle or to discharge the sucked water externally to the vehicle. The control device may receive a command from the control center to collect the sucked water in a tank or to discharge the sucked water externally of the vehicle and based on that command control the vehicle. Alternatively, the control device may determine, based on the current volume of water in the tank, if the sucked water should be collected in the tank or if it should be discharged. The control device may determine the current water volume in the tank based on data from a level gauge inside the tank. The control device may know the volume of the tank and based on the tank volume and the current water volume determine if the tank can accommodate more water. Thus, when the control device determines that the tank can accommodate more water, the valve arrangement may be controlled to collect the sucked water in the tank. When the control device determines that the tank cannot accommodate more water, the valve arrangement may be controlled to discharge the sucked water. The vehicle may thus comprise a tank for accommodating water. The tank may be configured to accommodate about 500-3000 litres of water. By collecting the water in a tank on the vehicle, the water may subsequently be used for fire extinguishing. Alternatively, the water is discharged through an outlet of the vehicle. The water may be discharged on a location where it does not pose any risk and/or the water may be discharged to extinguish a fire.

The water hose may be manually connected to the at least one connection unit. Alternatively, the water hose is permanently connected to the at least one connection unit. Alternatively, the step of controlling the vehicle to perform a safety function comprises autonomously connecting a water hose to the at least one connection unit by means of a robotic arm on the vehicle. The control device may thus control the robotic arm to grip a water hose and connect one end of the water hose with the at least one connection unit. The control device may control the robotic arm based on information from the sensor devices. For example, the control device may determine the position of the water hose based on camera information and data from proximity sensors. The control device may subsequently control the robotic arm to the position of the water hose.

The robotic arm of the vehicle may be a conventional programmable robotic arm. The robotic arm may thus be a mechanical arm comprising a plurality of links connected by at least one joint. The at least one joint may allow rotational motion and/or translational motion. The robotic arm is connected to the vehicle at one end, and may comprise an end effector at the other end. The end effector may comprise gripping means, enabling the robotic arm to grip/hold different objects. Alternatively, the end effector comprises a quick coupling configured to connect the robotic arm with different tools. The robotic arm may be configured to have a long reach. The robotic arm may be configured to reach a distance corresponding to the length of the vehicle. The robotic arm may comprise a plurality of sensor devices to enable precise control of the robotic arm. Such sensor device may comprise laser, radar, cameras etc. The control device may control the robotic arm based on data from the sensor devices arranged on the robotic arm and based on data from sensor devices arranged on the vehicle sides. The vehicle may comprise a plurality of robotic arms.

According to an example, when the emergency situation relates to a fire, the step of controlling the vehicle to perform a safety function comprises controlling the valve arrangement and the water pump to discharge water from an external water source connected to the at least one connection unit through a first outlet of the vehicle to extinguish the fire. The command from the control center may comprise information about the emergency situation relating to a fire. The command may comprise instructions to connect the at least one connection unit with an external water source. The control device may thus, based on the command from the control center, control the vehicle to connect the at least one connection unit with an external water source.

Controlling the vehicle to perform a safety function may comprise verifying that the external water source is connected to the at least one connection unit before controlling the valve arrangement and the water pump to discharge water from the external water source via the first outlet. Verifying that the external water source is connected to the at least one connection unit may comprise receiving signals from a sensor arranged at the at least one connection unit. The sensor may be configured to determine when an external water source is connected to the at least one connection unit. Suitably, the sensor will send a signal to the control device indicating correct connection between the external water source and the at least one connection unit.

The external water source may be a fire hydrant or any other public water source. The external water source may be configured to communicate wirelessly. The method may thus comprise establishing wireless communication with the external water source. The external water source may be connected to the at least one connection unit via an adapter, a coupling unit, a connecting hose or similar. The external water source may be arranged under the ground on which the vehicle is operating or the external water source may be arranged over ground. The external water source may be manually connected to the at least one connection unit. Alternatively, the step of controlling the vehicle to perform a safety function comprises autonomously connecting the external water source to the at least one connection unit by means of the robotic arm on the vehicle. The control device may control the robotic arm based on information from the sensor devices on the robotic arm and on the vehicle. For example, the control device may determine the position of the external water source based on camera information and data from proximity sensors. The control device may subsequently control the robotic arm to the position of the external water source.

In the event that the external water source is positioned underground, the control device may control the robotic arm to open a hatch in the ground to access the external water source. Thereafter the control device may control the robotic arm to connect the external water source to the at least one connection unit. In this example, the at least one connection unit may be positioned at a bottom side of the vehicle. Controlling the vehicle to perform a safety function may thus comprise controlling the vehicle to a position where the at least one connection unit is positioned above the external water source. Alternatively, controlling the vehicle to perform a safety function comprises controlling the vehicle to a position adjacent the external water source before controlling the robotic arm to connect the external water source with the at least one connection unit. In this case, the at least one connection unit may be positioned on a left, right, front or rear side of the vehicle. Controlling the vehicle to perform a safety function may thus comprise controlling the vehicle to a position where the at least one connection unit is aligned with the external water source. Controlling the vehicle to perform a safety function may further comprise controlling the robotic arm to remove a protection cover arranged on the at least one connection unit. Controlling the vehicle to perform a safety function may further comprise controlling the robotic arm to connect a coupling unit/adapter and/or a connecting hose to the external water source, and connect the at least one connection unit with the external water source via the coupling unit/adapter and/or the connecting hose. The coupling unit/adapter and the connecting hose may be arranged on the vehicle, so that the robotic arm can be controlled to grab the coupling unit/adapter/connecting hose and connect it to the external water source. The control device may receive information about which coupling unit/adapter and/or connecting hose is required for the specific external water source from the control center. Alternatively, the control device may determine which coupling unit/adapter and/or connecting hose is required for the external water source by reading a RFID on the external water hose or based on data from the sensor devices. Controlling the robotic arm to connect a connecting hose to the external water source may comprise controlling the robotic arm to rotate the connecting hose. The robotic arm may comprise sensor devices configured to detect forces (torque) applied by means of the robotic arm. This way, the robotic arm can be controlled to connect the connecting hose to the external water source with reduced risk for damaging the connecting hose and/or the external water source. When the external water source is connected to the at least one connection unit, the control device may transmit this information to the control center.

According to an example, when the emergency situation relates to a fire, the first outlet comprises a water cannon, wherein controlling the vehicle to perform a safety function comprises controlling the water cannon. The control device may receive a command from the control center to discharge the water from the external water source by means of the water cannon. Alternatively, the method comprises determining, based on data from the sensor devices, that the water from the external water source should be discharged by means of the water cannon. The control device may, for example, determine to discharge the water with the water cannon when no rescue workers are available to control a water hose. The water cannon may be arranged on the roof of the emergency vehicle. The water cannon may be controlled based on information about the fire to be extinguished. For example, the water cannon may be autonomously controlled by the control device, based on data from heat sensors or cameras indicating where the fire is located, so that the water cannon discharges the water in direction of the fire. Alternatively, the water cannon may be remotely controlled by an operator, so that the water cannon discharges the water in direction of the fire. Controlling the vehicle to perform a safety function may comprise controlling the robotic arm to connect a suitable nozzle or jet on the water cannon. The nozzle/jet may be determined based on information relating to the fire to extinguish. The control device may determine a suitable nozzle/jet based on information received from the control center. Controlling the water cannon may comprise continuously determining, based on data from the sensor device, where the discharged water is directed and continuously adjusting the direction of the water cannon and the water flow/pressure to optimize the firefighting.

The vehicle may comprise a first connection unit and a second connection unit for connecting an external water source and/or a water hose to the vehicle. The vehicle may comprise any number of connection units for connecting an external water source and/or a water hose to the vehicle. Each connection unit may be arranged in fluid communication with the conduits, the valve arrangement and the water pump.

According to another example, when the emergency situation relates to a fire, the first outlet comprises a second connection unit connected to a water hose, wherein controlling the vehicle to perform a safety function comprises controlling the valve arrangement and the water pump to discharge water from the external water source through the water hose. In this example, a first connection unit is connected to the external water source and a second connection unit is connected to a water hose for discharge of the water from the external water source. The control device may receive a command from the control center to discharge the water from the external water source by means of the second connection unit and the water hose. Alternatively, the control device determines, based on data from the sensor devices, that the water should be discharged by means of the water hose. The control device may, for example, determine to discharge the water with the water hose when there are rescue workers available to handle a water hose. Controlling the vehicle to perform a safety function may comprise autonomously connecting the water hose to the second connection unit by means of the robotic arm. The control device may thus control the robotic arm to grip the water hose and connect one end of the water hose with the second connection unit. Alternatively, the water hose is permanently connected to the second connection unit. Before controlling the valve arrangement and the water pump to discharge water from the external water source via the second connection unit and the water hose, the control device may receive a verification that a rescue worker is ready to handle the water hose. This verification may be received by means of a rescue worker manoeuvring a manoeuvring means on the vehicle. The manoeuvring means may comprise a button, switch, lever or similar. The verification may thus be received by the rescue worker pressing a button or manoeuvring a lever or similar. The manoeuvring means may form part of a control panel of the vehicle. The manoeuvring of the manoeuvring means will transmit a signal to the control device, indicating that a rescue worker is ready to handle a water hose connected to the vehicle. The control device may then control the valve arrangement and the water pump to discharge water through the water hose.

In another example, the second connection unit is connected to a fire engine, whereby the water from the external water source is discharged via the second connection unit to the fire engine. The fire engine may be connected to the second connection unit via a connecting hose. Controlling the vehicle to perform a safety function may thus comprise, when the first outlet is the second connection unit, controlling the robotic arm to connect a connecting hose to the second connection unit for connection to a fire engine.

When the emergency situation relates to a fire, the step of controlling the vehicle to perform a safety function may comprise controlling the robotic arm on the vehicle to activate the external water source to enable a water flow from the external water source to the vehicle. The external water source may comprise an actuator/control means, such as a lever, latch or faucet, which needs to be actuated in order to allow water to flow from the external water source. The robotic arm may be controlled to actuate this control means and thereby activate the external water source. The robotic arm may thus be controlled to mechanically affect the actuator, and thereby activate the external water source. The control device may control the robotic arm to activate the external water source after having verified that the external water source is correctly connected to the at least one connection unit. The control device may receive a command from the control center to activate the external water source.

According to an example, the method further comprises: collecting data relating to the emergency situation from the sensor devices, wherein the vehicle is controlled to perform the safety function based on the collected data. The collected data may comprise the location/direction of the emergency situation, the distance to the emergency situation, temperature, water pressure, wind direction and/or wind force. Based on this data, the control device may control the vehicle to a suitable position, control the water cannon to discharge water in a suitable direction and similar.

The step of controlling the vehicle to perform a safety function may further comprise selecting a tool for performing the safety function; and controlling the robotic arm to connect with the tool. As an example, the control device may comprise a list of predetermined emergency situations and corresponding predetermined tools needed for safety functions in a database. The control device may thus determine the current emergency situation and compare with the list to select a suitable tool. The vehicle may comprise a plurality of different tools arranged within reach of the robotic arm. The tools may comprise a hammer, a hook, a magnet, a wrench or similar. The control device may select a tool for performing the safety function based on data from the different sensor devices. The control device may select a tool for performing the safety function based on information from the control center. For example, the control device may detect a fire inside a vehicle. The control device may then determine that a window should be broken to access the fire. The control device may thus control the robotic arm to connect with a hammer. In another example, the control device may control the robotic arm to connect with a wrench to actuate an actuator of the external water source. In another example, the control device controls the robotic arm to connect with a magnet to open a hatch by means of the magnet. In one example, the tool comprises a weapon for puncturing an object that might explode in a fire, for example a gas tube or similar. Thus, in the event that the control device identifies an object that might explode due to a fire, the control device may control the robotic arm to connect with the weapon and fire the weapon in direction of the object.

The tools may be arranged behind a hatch on the vehicle. The hatch may be automatically opened or closed by the control device. The robotic arm may be connected to the tools by means of a quick coupling of the robotic arm. The robotic arm may be connected to the tools by means of an electrical quick coupling. Alternatively, the robotic arm may be connected to the tools by gripping the tools with the end effector.

According to an example, when the emergency situation relates to a fire, the step of controlling the vehicle to perform a safety function comprises controlling the valve arrangement and the water pump to discharge water contained in a tank in the vehicle through a second outlet of the vehicle to extinguish the fire. The second outlet may comprise the at least one connection unit or the water cannon. In the event that the vehicle comprises a first connection unit and a second connection unit, the second outlet may comprise the water cannon, the first connection unit or the second connection unit. The second outlet may be different from the first outlet. The control device may determine, based on data from the sensor devices, that the water in the tank should be discharged by means of a water hose connected to the at least one connection unit and/or if water should be discharged by means of the water cannon. The control device may, for example, determine to discharge the water in the tank with the water hose based on a request from a rescue worker available to handle a water hose. The control device may receive a command from the control center to discharge the water in the tank via the water cannon. Controlling the vehicle to perform a safety function may comprise controlling the water cannon to discharge water from the tank. Controlling the vehicle to perform a safety function may alternatively comprise autonomously connecting a water hose to the at least one connection unit (the first or the second connection unit) by means of the robotic arm. How a water hose may be connected to the different connection units is described above.

The control device may control the valve arrangement and the water pump to discharge water from an external water source via a first outlet and simultaneously discharge water from a tank on the vehicle via a second outlet, or vice versa. This way, water may be discharged through a water cannon at the same time as water is discharged via a water hose handled by a rescue worker. The control device may receive a command from the control center to discharge the water from the external water source via the first outlet and to discharge water from a tank via a second outlet. The command from the control center may also comprise information about the first outlet and the second outlet. The control device will then control the valve arrangement accordingly.

The step of controlling the vehicle to perform a safety function may additionally or alternatively comprise, when the emergency situation relates to a fire, controlling the valve arrangement and the water pump to discharge water (contained in a tank or from an external water source) and foaming agent contained in a tank in the vehicle through a second outlet of the vehicle to extinguish the fire. Foaming agent may be mixed with the water to create a fire extinguishing foam. The foaming agent may be mixed with the water by means of compressed air. This way, the number of bubbles in the foam is increased and a fire extinguishing foam may be created, which is dryer and thereby reduces the risk for water damages. The vehicle may thus comprise a tank for accommodating a foaming agent. The vehicle may further comprise an air compressor and a reservoir for compressed air. The tank for foaming agent and the reservoir for compressed air may be arranged in fluid communication with the conduits, the first outlet and/or the second outlet. The step of controlling the vehicle to perform a safety function may thus comprise, when the emergency situation relates to a fire, controlling the valve arrangement and the water pump to discharge water, foaming agent contained in a tank in the vehicle and compressed air contained in a reservoir in the vehicle through a second outlet of the vehicle to extinguish the fire The present disclosure also relates to a computer program comprising instructions which, when the program is executed by a computer, causes the computer to carry out the method disclosed above. The present disclosure further relates to a computer-readable medium comprising instructions, which when executed by a computer causes the computer to carry out the method disclosed above.

According to another aspect of the present disclosure, a control device of an emergency vehicle is provided. The control device is configured to autonomously operate the emergency vehicle. The emergency vehicle comprises: an energy storage unit arranged to supply power for propulsion of the vehicle and/or for performing safety functions; sensor devices arranged to monitor the surroundings and the vehicle; a water pump; at least one connection unit for an external water source and/or a water hose; conduits arranged in fluid communication with the water pump and/or the at least one connection unit; a valve arrangement arranged in fluid communication with the water pump, the at least one connection unit and the conduits; wherein the valve arrangement is configured to regulate the flow and/or pressure in the conduits and the at least one connection unit, the control device being configured to: receive a command from a control center to operate the vehicle to a location associated with an occurring emergency situation; operate the vehicle to the location; and control the vehicle to perform a safety function to alleviate the emergency situation. The control device may be configured to control the vehicle to perform a safety function based on commands from the control center, based on control signals from a remote control, based on data from the sensor devices or based on manual input.

It will be appreciated that all the embodiments described for the method aspect of the disclosure performed by the control device are also applicable to the control device aspect of the disclosure. That is, the control device may be configured to perform any one of the steps of the method according to the various examples described above. Thus, the control device may be configured to, when the emergency situation relates to a flood, control the valve arrangement and the water pump to suck water from the flood via a water hose connected to the at least one connection unit. The control device may be configured to receive a command from the control center to suck water. The control device may be configured to detect that a water hose is connected to the at least one connection unit before controlling the valve arrangement and the water pump to suck water. The control device may be configured to control a robotic arm on the vehicle to autonomously connect the water hose to the at least one connection unit. Furthermore, the control device may be configured to control the valve arrangement to collect the water in a tank on the vehicle or discharge the water externally to the vehicle. The control device may be configured to receive a command from the control center to collect the sucked water in a tank or to discharge the sucked water externally of the vehicle and based on that command control the vehicle. The control device may be configured to determine, based on the current volume of water in the tank, if the sucked water should be collected in the tank or if it should be discharged.

According to an example, the control device is configured to, when the emergency situation relates to a fire, control the valve arrangement and the water pump to discharge water from an external water source connected to the at least one connection unit through a first outlet of the vehicle. The control device may be configured to receive a command from the control center to connect the at least one connection unit to an external water source and based on this command control the vehicle to connect the at least one connection unit with an external water source. The control device may be configured to verify that the external water source is connected to the at least one connection unit before controlling the valve arrangement and the water pump to discharge water from the external water source. The control device may be configured to verify that the external water source is connected to the at least one connection unit by receiving signals from a sensor arranged at the at least one connection unit. The control device may be configured to control a robotic arm on the vehicle to autonomously connect the external water source to the at least one connection unit. The control device may be configured to determine the position of the external water source and control the robotic arm to the determined position. In the event that the external water source is positioned underground, the control device may be configured to control the robotic arm to open a hatch in the ground to access the external water source. The control device may be configured to control the robotic arm to connect a coupling unit/adapter and/or connecting hose to the external water source and connect the at least one connection unit with the external water source via the coupling unit/adapter and/or connecting hose.

In one example, the first outlet comprises a water cannon and the control device is configured to control the water cannon to discharge the water. The control device may be configured to receive a command from the control center to discharge the water from the external water source by means of the water cannon. Alternatively, the control device may be configured to determine, based on data from the sensor devices, that the water should be discharged by means of the water cannon. The control device may, for example, be configured to determine to discharge the water with the water cannon when no rescue workers are available to control a water hose. In another example, the first outlet comprises a second connection unit connected to a water hose, and the control device is configured to control the valve arrangement and the water pump to discharge water through the second connection unit and the water hose. The control device may be configured to receive a command from the control center to discharge the water from the external water source by means of the second connection unit and the water hose. Alternatively, the control device may be configured to determine, based on data from the sensor devices, that the water should be discharged by means of the water hose. The control device may, for example, be configured to determine to discharge the water with the water hose based on a request from a rescue worker. The control device may be configured to control the robotic arm to grip the water hose and connect one end of the water hose with the second connection unit. The control device may be configured to receive a verification that a rescue worker is ready to handle the water hose, before controlling the valve arrangement and the water pump to discharge water from the external water source via the second connection unit and the water hose.

The control device may further be configured to control a robotic arm on the vehicle to activate the external water source to enable a water flow from the external water source to the vehicle. The control device may be configured to control the robotic arm to actuate an actuator of the external water source in order to allow water to flow from the external water source. The control device may be configured to control the robotic arm to activate the external water source after having verified that the external water source is correctly connected to the at least one connection unit.

The control device may be configured to collect data relating to the emergency situation from the sensor devices; and control the vehicle to perform the safety function based on the collected data. The control device may be configured to collect data comprising the location/direction of the emergency situation, the distance to the emergency situation, temperature, water pressure, wind direction and/or wind force.

According to an example, the control device is configured to select a tool for performing the safety function and control the robotic arm to connect with the tool. As an example, the control device may comprise a list of predetermined emergency situations and corresponding predetermined tools needed for safety functions in a database. The control device may thus be configured to determine the current emergency situation and compare with the list to select a suitable tool. The control device may be configured to select a tool for performing the safety function based on data from the different sensor devices.

The control device may be configured to, when the emergency situation relates to a fire, control the valve arrangement and the water pump to discharge water contained in a tank in the vehicle through a second outlet of the vehicle. The control device may be configured to control the valve arrangement and the water pump to discharge water from an external water source via a first outlet and simultaneously discharge water from a tank on the vehicle via a second outlet.

According to another aspect of the present disclosure, an emergency vehicle configured to be autonomously operated is provided. The vehicle comprises an energy storage unit arranged to supply power for propulsion of the vehicle and/or for performing safety functions; sensor devices arranged to monitor the surroundings and the vehicle; a water pump; at least one connection unit for an external water source and/or a water hose; conduits arranged in fluid communication with the water pump and/or the at least one connection unit; and a valve arrangement arranged in fluid communication with the water pump, the at least one connection unit and the conduits; wherein the valve arrangement is configured to regulate the flow of water and/or pressure in the conduits and the at least one connection unit, the vehicle further comprising a control device as disclosed herein.

The emergency vehicle may comprise a first connection unit for connection to an external water source. The emergency vehicle may further comprise a second connection unit for connection to a water hose. The second connection unit may also be used for connection to a fire engine via a connecting hose attached to the second connection unit. A connecting hose may be referred to as a water hose. The emergency vehicle may further comprise a third connection unit for connection to an external water source. The vehicle may further comprise a first outlet and a second outlet. The first and second outlet may comprise a water cannon. The water cannon may be arranged on the roof of the vehicle. The first and second outlet may alternatively comprise the second connection unit. Thus, the water hose/connecting hose connected to the second connection unit may be used for discharging water, in which case the second connection unit may be referred to as an outlet. In this example, the first and third connection unit may be configured to fit a typical external water source, whereas the second connection unit is configured to fit an end of a water hose. Alternatively, the vehicle comprises a first, second and third connection unit where all three connection units are connectable to external water sources and water hoses. The first, second and third connection unit may thus be identically configured. In this example, an adapter or coupling unit may be used to connect an external water source or a water hose to the different connection units. Suitably, the vehicle comprises a number of adapters, configured to fit the connection units of the vehicle at one end, and to fit an external water source or a water hose at the other end. All connection units of the vehicle are arranged in fluid communication with the conduits, the water pump and the valve arrangement. Connection units configured for connection with an external water source may be arranged underneath the vehicle or on either side (left, right, front or rear) of the vehicle. Connection units for connection with a water hose may be arranged on either side (left, right, front or rear) of the vehicle. The vehicle may comprise a plurality of water hoses (connecting hoses). The water hoses may be configured to be connected to any of the connection units for discharge of water, for sucking water and/or for connection to an external water source or a fire engine.

The vehicle may comprise at least one sensor device arranged on the roof of the vehicle, at least one sensor device arranged underneath the vehicle and/or at least one sensor device on each other side of the vehicle.

As described above, the emergency vehicle may comprise a robotic arm configured to be controlled by the control device. The robotic arm may be arranged on the outside of the vehicle or behind an openable hatch. The robotic arm may be arranged, such that it is accessible from the outside of the vehicle. The vehicle may also comprise a plurality of tools configured to be connected to the robotic arm. The tools are thus arranged within reach of the robotic arm, for example behind a hatch or similar. The emergency vehicle may further comprise a tank for accommodating water and/or a tank for accommodating foaming agent. The tank(s) may be arranged in fluid communication with the first outlet and/or the second outlet. The first outlet and the second outlet may thus be configured for discharging water and/or foam. The tank(s) are arranged in fluid communication with the first outlet and the second outlet via the conduits. The emergency vehicle may further comprise an air compressor and a reservoir for compressed air. The compressed air may be used to mix foaming agent with water to create a fire extinguishing foam.

The emergency vehicle may also comprise a control panel for manual control of various functions of the vehicle. Manual control will override the autonomous control of the vehicle. Thus, if the control device receives signals from the control panel, the control device will control the vehicle based on these signals rather than based on commands from the control center. In one example, the emergency vehicle is remotely controlled. The control device may thus be configured to control the emergency vehicle based on received control signals from a remotely located remote control, such as a joystick or similar. In one example, the water cannon may be remotely controlled. The emergency vehicle may be manually controlled or remotely controlled when the emergency vehicle has arrived at the location associated with the emergency situation. Thus, the vehicle may be autonomously operated to the location of the emergency situation based on a command from the control center, and when the vehicle has arrived at the location rescue workers may provide the control device with control signals either remotely or via the control panel.

The emergency vehicle may further comprise an electric cable for external power supply. In the event that the emergency vehicle is operating during a long time, the energy storage unit may not be enough to supply power to the electrically driven components of the vehicle, such as the robotic arm, the propulsion unit, the water pump, the valve arrangement, the water cannon etc. The emergency vehicle may then be connected to an electricity network and thereby be provided with power to perform all necessary safety functions. In one example, the control device is configured to control the robotic arm to connect the electric cable to an external power supply source, such as an electricity network/grid. The safety method may thus comprise connecting an electric cable to an external power supply source. The control device may thus be configured to determine the state of charge of the energy storage unit and based on the state of charge determine if external power supply is required. Alternatively, the electric cable is connected to an external power supply source manually.

According to an example, the vehicle is assembled from a set of modules and comprises: a functional module; and at least one drive module connected to the functional module, wherein the at least one drive module comprises a pair of wheels and a propulsion unit and is configured to be autonomously operated and drive the vehicle. Assembling a vehicle from a set of modules according to the example makes it possible to dynamically assemble a modularised vehicle depending on a current mission or function to be performed. This way, from the same set of modules, for example a truck, a garbage truck, a bus or a snowplough can be assembled. Not only will this result in an increased flexibility, but the cost for a vehicle owner will decrease significantly compared to having a plurality of different vehicles for different applications. The vehicle is autonomously operated by means of the at least one drive module.

The set of modules from which the emergency vehicle is assembled may comprise a plurality of drive modules and a plurality of functional modules. The different drive modules of the set of modules may be identical or the drive modules may for example have different types/sizes of wheels, different suspension, different power capacity and/or different charge capacity. Each drive module may comprise a body. In one example, the at least one pair of wheels are arranged on opposite sides of the body of the drive module. In an example, the drive module has only one pair of wheels. The propulsion unit of the drive module may be an electric machine, connected to the wheels. The pair of wheels of the drive module may thus be referred to as drive wheels. In one example, the drive module(s) comprises two electrical machines, one connected to each wheel. The electric machines may be arranged in the rim of the wheels. The wheels of the drive module can thus be driven independently of each other. The electric machines may also work as generators and generate electric power when braking the wheels. The drive module may also comprise a steering system connected to the wheels. This way, the drive module is steerable. The drive module may also comprise a brake system for braking the wheels. Suitably, the brake system comprises a wheel brake for each wheel of the drive module. Redundancy is achieved in that the drive module can be steered by means of the electrical machines and/or the wheel brakes in the event that the steering system malfunctions. In one example, the energy storage unit of the emergency vehicle is comprised in the at least one drive module. The energy storage unit may thus be arranged for providing the propulsion unit of the at least one drive module with energy. The emergency vehicle may comprise a plurality of energy storage units, one in each module. Thus, the at least one drive module may comprise an energy storage unit and the functional module may comprise an energy storage unit. The energy storage unit(s) may be an electric battery. The electric battery may be rechargeable. The sensor devices arranged to monitor the surroundings and the vehicle may be arranged on the at least one drive module and/or the functional module. The at least one drive module being configured to be autonomously operated means that the drive module comprises a plurality of sensors and systems for steering and driving the drive module automatically as an independent unit according to conventional methods. According to an example, the drive module comprises a navigation system and sensors for detecting objects in the surrounding of the drive module. The drive module may be referred to as an autonomously operated vehicle in the sense that it is allowed to operate on public roads.

Each functional module of the set of modules is configured to perform a predetermined function while being part of an assembled vehicle. A functional module of the set of modules may be configured to accommodate or support a load. A functional module may be configured for accommodating passengers and may thus form a bus when being assembled with at least one drive module. A functional module may alternatively be configured for transporting goods and may thus form a truck when being assembled with at least one drive module. In this example, the functional module is configured to function as an emergency vehicle when being connected to the at least one drive module. The functional module may thus comprise the water pump, the at least one connection unit, the conduits the robotic arm and the valve arrangement. The functional module may also comprise the air compressor and the reservoir for compressed air. The functional module may comprise trailing wheels, which are not driven or steerable. The functional module cannot move on its own but needs to be connected to at least one drive module to be able to move, the functional module and the drive module thereby together forming a vehicle.

According to one example, each module of the emergency vehicle may comprise a control unit. The control device may thus comprise control units of each module of the emergency vehicle. Suitably, all modules of the vehicle are configured to communicate with the control center. The control center may be adapted to receive information about missions or functions to be performed and based on this mission/function initiate assembly/disassembly of a vehicle.

According to an example, when the emergency vehicle is assembled from a set of modules, the control device is configured to disconnect the at least one drive module from the vehicle at the location of the emergency situation, and control the at least one drive module to move away from the location of the emergency situation. Similarly, the method may comprise, when the vehicle is assembled from a set of modules, disconnecting the at least one drive module from the vehicle at the location of the emergency situation and controlling the at least one drive module to move away from the location of the emergency situation. This way, the functional module will be left at the location of the emergency situation and will be controlled to perform safety functions. The at least one drive module will instead move away from the extremely hot and smoky area. This way, the at least one drive module does not have to be configured to withstand the extreme heat. The control device may be configured to physically disconnect the at least one drive module from the rest of the vehicle. Physically disconnecting the at least one drive module may comprise controlling a physical interface of the at least one drive module. The at least one drive module may be physically connected to the functional module through corresponding physical interfaces. Such physical interfaces may be configured in different ways, and may for example comprise coupling units adapted to engage, quick couplings, hooks, cooperating protrusions and recesses or similar. Physically disconnecting the at least one drive module may thus comprise controlling a coupling unit, a quick coupling, a hook or similar. The control device may also be configured to electrically disconnect the at least one drive module from the vehicle. The modules of the assembled vehicle may be electrically connected with each other via corresponding electrical interfaces. Electrically disconnecting the at least one drive module may comprise inactivating communication means in the at least one drive module. The communication means of the at least one drive module may be comprised in the electrical interface of the at least one drive module. The electrical interface may be configured to transfer electric energy and/or to transmit and/or receive electric signals. The electrical interface may be a wireless interface and/or a conductive interface. The communication means in the at least one drive module is thus means for transferring electric energy and/or transmitting/receiving electric signals to/from other modules of the vehicle. The communication means may comprise an internal communication network, such as CAN J1939, Flexray, Ethernet, fiber or similar. The communication means may alternatively or additionally comprise a transmitter and/or a receiver for wireless communication. The communication means may be inactivated by means of controlling a switch, a contactor or similar. In addition to the communication means for communicating with another module, the at least one drive module also comprises wireless communication means for communicating with the control center.

According to another aspect of the present disclosure, a system associated with an emergency vehicle is provided. The system comprises: an emergency vehicle and a control center, wherein the emergency vehicle is configured to be autonomously operated based on commands from the control center. The vehicle may be assembled from a set of modules and may thus comprises at least one drive module; and at least one functional module, wherein the at least one drive module comprises a pair of wheels and is configured to be autonomously operated and drive the assembled vehicle.

The present disclosure will now be further illustrated with reference to the appended figures.

FIG. 1 schematically illustrates an emergency vehicle 1 according to an example. The emergency vehicle 1 is configured to be autonomously operated. The emergency vehicle 1 comprises at least one propulsion unit 2, an energy storage unit 4 arranged to supply power for propulsion of the vehicle 1 and/or for performing safety functions; sensor devices 6 arranged to monitor the surroundings and the vehicle 1; a water pump 8; at least one connection unit 10 for an external water source 20 and/or a water hose 30; conduits 12 arranged in fluid communication with the water pump 8 and/or the at least one connection unit 10; and a valve arrangement 14 arranged in fluid communication with the water pump 8, the at least one connection unit 10 and the conduits 12. The valve arrangement 14 is configured to regulate the flow of water and/or pressure in the conduits 12 and the at least one connection unit 10. The emergency vehicle 1 further comprises a control device 100. The emergency vehicle 1 may be autonomously operated by means of the control device 100. The control device 100 may be arranged in communication with a control center 200. The control center 200 may transmit commands to the control device 100, whereby the control device 100 controls the emergency vehicle 1 autonomously based on these commands. The control device 100 may be configured to control the at least one propulsion unit 2, the water pump 8 and the valve arrangement 14. The control device 100 may be arranged in communication with the at least one propulsion unit 2, the energy storage unit 4, the sensor devices 6, the water pump 8, the at least one connection unit 10 and the valve arrangement 14. By controlling the valve arrangement 14 the control device 100 can control the water flow and pressure in the conduits 12 and the at least one connection unit 10. The control device 100 will be further described with regard to FIG. 4 below.

The emergency vehicle 1 may comprise a first connection unit 10' for connection with an external water source 20 and a second connection unit 10" for connection with a water hose 30. The first connection unit 10' may be arranged underneath the emergency vehicle 1 to connect with an external water source 20 being arranged under the ground. The emergency vehicle 1 may further comprise a first outlet 16 for discharging water. The first outlet 16 may comprise a water cannon 18 arranged on the roof of the vehicle 1. The first outlet 16 may alternatively comprise the second connection unit 10". Water may thus be discharged from the emergency vehicle 1 by means of a water cannon 18 or by means of a water hose 30. The emergency vehicle 1 may comprise a water hose 30 connected to the at least one connection unit 10. The water hose 30 may be used to draft/suck water from a flooded area and the water may subsequently be lead through the conduits 12 and the valve arrangement 14 to be discharged via the first outlet 16 comprising the water cannon 18. The water hose 30 may alternatively be used to discharge water from an external water source 20 connected to the first connection unit 10'. Thus, in that case, water from an external water source 20 is entering the vehicle 1 via the first connection unit 10' and is lead through the conduits 12 and the valve arrangement 14 to be discharged via the second connection unit 10" and the water hose 30.

The vehicle 1 may comprise at least one sensor device 6 arranged on the roof of the vehicle 1, at least one sensor device 6 arranged underneath the vehicle 1 and/or at least one sensor device 6 on each other side of the vehicle 1.

Figure 2:
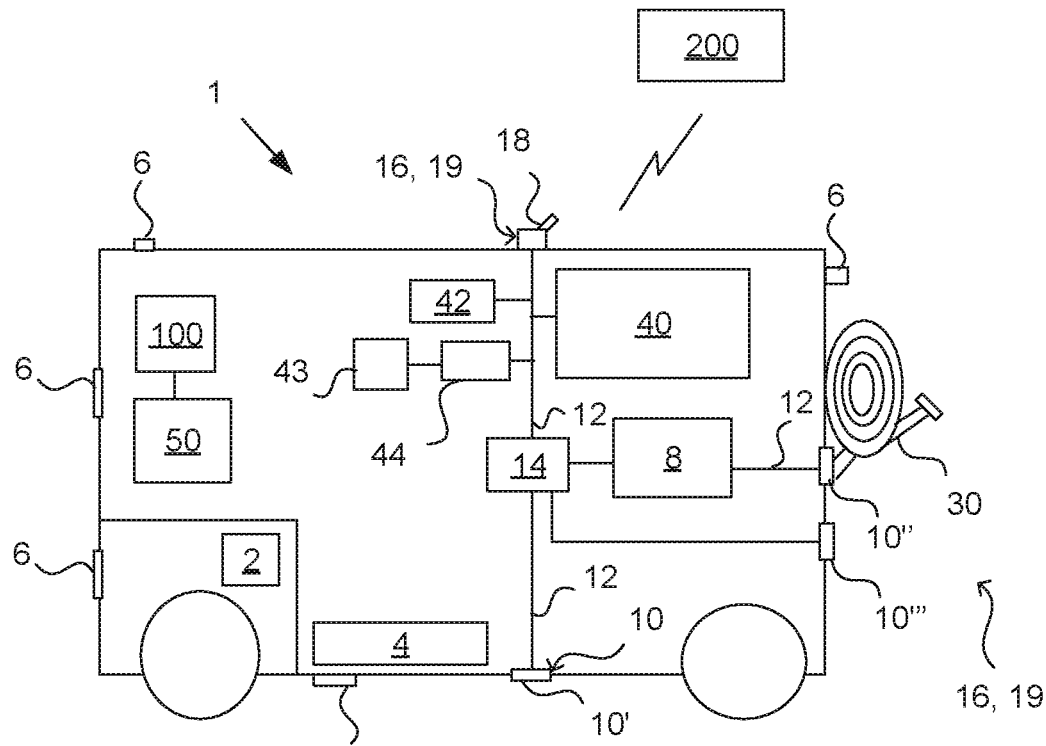
FIG. 2 schematically illustrate an emergency vehicle according to an example.

FIG. 2 schematically illustrates an emergency vehicle 1 according to an example. The emergency vehicle 1 may be configured as disclosed in FIG. 1. In this example, the emergency vehicle 1 comprises a first connection unit 10' and a third connection unit 10''' for connection to an external water source 20. The first connection unit 10' may be arranged underneath the vehicle 1 and the third connection unit 10''' may be arranged on a rear side of the vehicle 1. The emergency vehicle 1 further comprises a second connection unit 10" for connection to a water hose 30. The emergency vehicle 1 may further comprise a first outlet 16 and a second outlet 19. The first outlet 16 may comprise the water cannon 18 or the second outlet 19 may comprise the water cannon 18. The first outlet 16 may alternatively comprise the second connection unit 10" or the second outlet 19 may alternatively comprise the second connection unit 10". It is to be understood that the vehicle 1 may comprise any numbers of connection units 10 for connection with external water sources 20 or water hoses 30.

The emergency vehicle 1 may further comprise a tank 40 for accommodating water. The tank 40 may be configured to accommodate about 500-3000 litres of water. The emergency vehicle 1 may also comprise a tank 42 for accommodating a foaming agent. The tanks 40, 42 are arranged in fluid communication with the first outlet 16 and/or the second outlet 19. The first outlet 16 and the second outlet 19 may thus be configured for discharging water and/or foaming agent. The tanks 40, 42 are arranged in fluid communication with the conduits 12, the valve arrangement 14 and the water pump 8. The foaming agent may be mixed with water before being discharged through the first outlet 16 or the second outlet 19. The foaming agent may be mixed with water from the tank 40 or with water from an external water source 20. The emergency vehicle 1 may further comprise an air compressor 43 and a reservoir 44 for accommodating compressed air. The reservoir 44 for accommodating compressed air may be arranged in fluid communication with the conduits 12. The compressed air may be used to mix the foaming agent with water, to thereby achieve a dryer fire extinguishing foam.

In this example, the emergency vehicle 1 may discharge water and/or foaming agent from the tanks 40, 42 via the first outlet 16 and water from an external water source 20 may be discharged via the second outlet 19, or vice versa. For example, an external water source 20 may be connected to the first connection unit 10' and this water is discharged via the first outlet 16 comprising the second connection unit 10''' and the water hose 30, and water and/or foaming agent from the tanks 40, 42 may be discharged via the second outlet 19 comprising the water cannon 18.

The emergency vehicle 1 may also comprise a control panel 50 for manual control of various functions of the vehicle 1. Manual control will override the autonomous control of the vehicle 1. Thus, if the control device 100 receives signals from the control panel 50, the control device 100 will control the vehicle 1 based on these signals rather than based on signals from the control center 200. Via the control panel 50, a rescue worker may request water to be discharged via the water cannon 18 or via a water hose 30. The control device 100 may then control the valve arrangement 14 and the water pump 8 to provide the water according to the request. Also, via the control panel 50 a rescue worker may request water to be sucked by means of a water hose 30, and to be collected in the water tank 40, whereby the control device 100 will control the valve arrangement 14 and the water pump 8 to suck water and collect it in the tank 40. In another example, the emergency vehicle 1 is remotely controlled. The emergency vehicle 1 may be manually controlled or remotely controlled when the emergency vehicle 1 has arrived at the location associated with the emergency situation.

Figure 3:
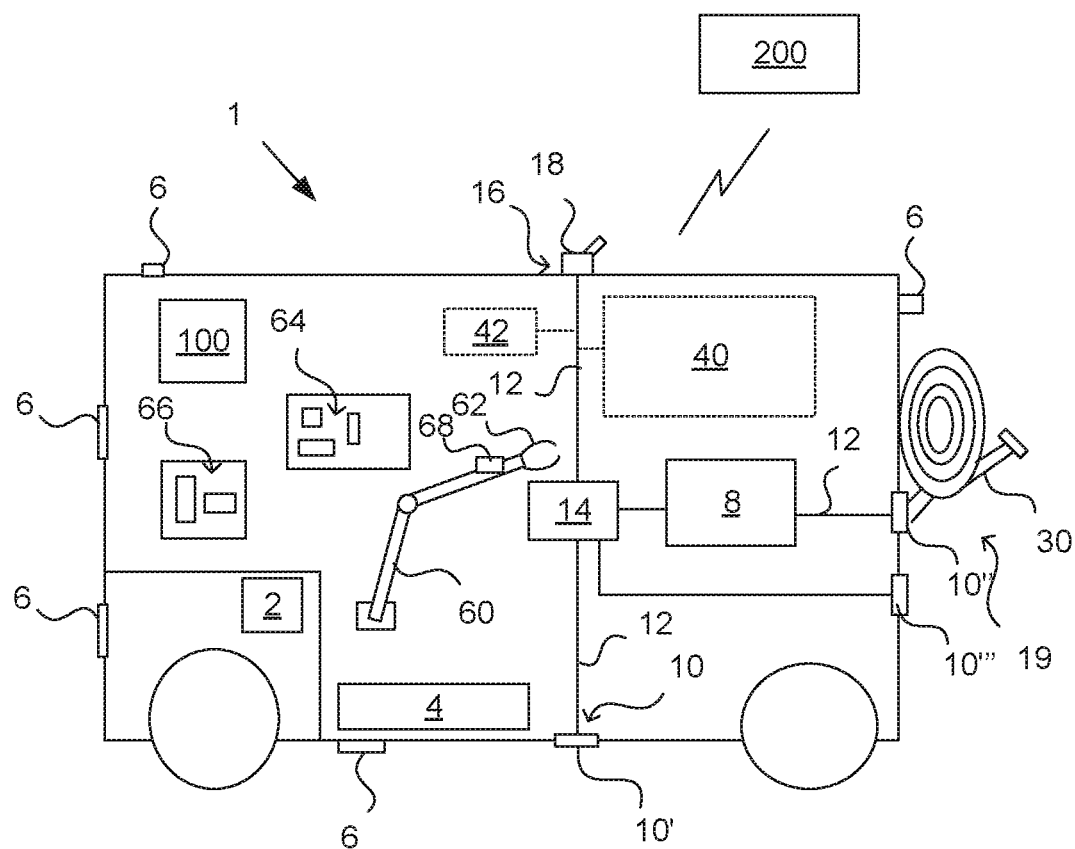
FIG. 3 schematically illustrates an emergency vehicle according to an example.

FIG. 3 schematically illustrates an emergency vehicle 1 according to an example. The emergency vehicle 1 may be configured as disclosed in FIG. 1 or FIG. 2. In this example, the emergency vehicle 1 comprises a first 10', second 10'' and third connection unit 10''' where all three connection units 10', 10'', 10''' are connectable to external water sources 20 and water hoses 30. An adapter/coupling unit 66 may be used to connect an external water source 20 or a water hose 30. Suitably, the vehicle 1 comprises a number of adapters 66, configured to fit the connection units 10', 10'', 10''' of the vehicle 1 at one end, and to fit an external water source 20 or a water hose 30 at the other end. All connection units 10', 10'', 10''' are arranged in fluid communication with the conduits 12, the water pump 8 and the valve arrangement 14.

The emergency vehicle 1 may further comprise a robotic arm 60 configured to be controlled by the control device 100. The robotic arm 60 is connected to the vehicle 1 at one end, and may comprise an end effector 62 at the other end.

The end effector 62 may comprise gripping means, enabling the robotic arm 60 to grip/hold different objects. Alternatively, the end effector 62 comprises a quick coupling configured to connect the robotic arm 60 with different tools 64. The robotic arm 60 may comprise a plurality of sensor devices 68 to enable precise control of the robotic arm 60. Such sensor device 68 may comprise laser, radar, cameras etc. The control device 100 may be configured to control the robotic arm 60 based on data from the sensor devices 68 arranged on the robotic arm 60 and based on data from sensor devices 6 arranged on the vehicle sides. The robotic arm 60 may be arranged on the outside of the vehicle 1 or behind an openable hatch (not shown). The emergency vehicle 1 may also comprise a plurality of tools 64 configured to be connected to the robotic arm 60. The tools 64 are thus arranged within reach of the robotic arm 60. The tools 64 may comprise a hammer, a hook, a magnet, a wrench or similar.

Figure 4:
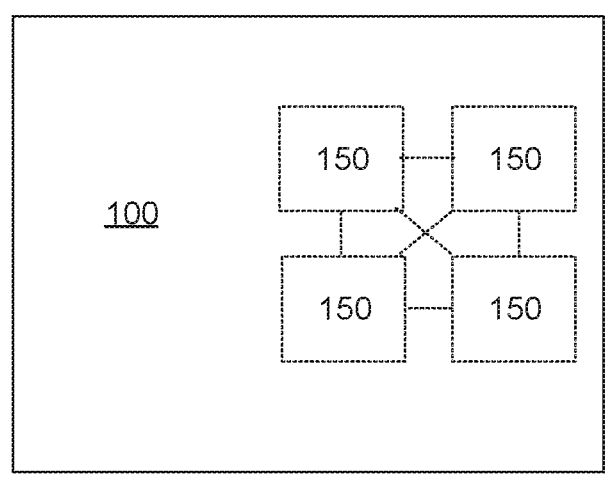
FIG. 4 schematically illustrates a control device according to an example.

FIG. 4 schematically illustrates a control device 100 of an emergency vehicle according to an example. The control device 100 may be comprised in an emergency vehicle 1 as disclosed in FIG. 1, FIG. 2 or FIG. 3. The control device 100 may be implemented as a separate entity or may comprise a plurality of entities, such as control units 150 or computers, as illustrated by the dashed boxes in the figure. The control device 100 is configured to autonomously operate the emergency vehicle 1.

The control device 100 may be configured to: receive a command from a control center 200 to operate the vehicle 1 to a location associated with an occurring emergency situation; operate the vehicle 1 to the location; and control the vehicle 1 to perform a safety function to alleviate the emergency situation. The control device 100 may be configured to control the vehicle 1 to perform a safety function based on commands from the control center 200.

The control device 100 may be configured to, when the emergency situation relates to a flood, control the valve arrangement 14 and the water pump 8 to suck water from the flood via a water hose 30 connected to the at least one connection unit 10, 10', 10'', 10'''. The control device 100 may be configured to receive a command from the control center 200 to suck water. The control device 100 may be configured to detect that a water hose 30 is connected to the at least one connection unit 10 before controlling the valve arrangement 14 and the water pump 8 to suck water.

The control device 100 may be configured to control a robotic arm 60 on the vehicle 1 to autonomously connect the water hose 30 to the at least one connection unit 10, 10', 10'', 10'''. Furthermore, the control device 100 may be configured to control the valve arrangement 14 to collect the water in a tank 40 on the vehicle 1 or discharge the water externally to the vehicle 1. The control device 100 may be configured to receive a command from the control center 200 to collect the sucked water in a tank 40 or to discharge the sucked water externally of the vehicle 1 and based on that command control the vehicle 1. The control device 100 may be configured to determine, based on the current volume of water in the tank 40, if the sucked water should be collected in the tank 40 or if it should be discharged.

The control device 100 may be configured to, when the emergency situation relates to a fire, control the valve arrangement 14 and the water pump 8 to discharge water from an external water source 20 connected to the at least one connection unit 10, 10', 10'', 10''' through a first outlet 16 of the vehicle 1 to extinguish the fire. The control device 100 may be configured to receive a command from the control center 200 to connect the at least one connection unit 10, 10', 10", 10'" to an external water source 20 and based on this command control the vehicle 1 to connect the at least one connection unit 10, 10', 10", 10'" with an external water source 20. The control device 100 may be configured to verify that the external water source 20 is connected to the at least one connection unit 10, 10', 10", 10'" before controlling the valve arrangement 14 and the water pump 8 to discharge water from the external water source 20. The control device 100 may be configured to control the robotic arm 60 to autonomously connect the external water source 20 to the at least one connection unit 10, 10', 10", 10'". The control device 100 may be configured to control the robotic arm 60 to connect a coupling unit/adapter 66 to the external water source 20 and connect the at least one connection unit 10, 10', 10", 10'" with the external water source 20 via the coupling unit/adapter 66.

The control device 100 may be configured to control the vehicle 1 to discharge the water from the external water source 20 by means of the water cannon 18. The control device 100 may be configured to receive a command from the control center 200 to discharge the water from the external water source 20 by means of the water cannon 18. Alternatively, the control device 100 may be configured to determine, based on data from the sensor devices 6, that the water should be discharged by means of the water cannon 18.

The control device may be configured to control the valve arrangement 14 and the water pump 8 to discharge water through a second connection unit 10, 10" and a water hose 30 connected to the second connection unit 10, 10". The control device 100 may be configured to receive a command from the control center 200 to discharge the water from the external water source 20 by means of the second connection unit 10" and the water hose 30. Alternatively, the control device 100 may be configured to determine, based on data from the sensor devices 6, that the water should be discharged by means of the water hose 30. The control device 100 may be configured to control the robotic arm 60 to grip the water hose 30 and connect one end of the water hose 30 with the second connection unit 10, 10". The control device 100 may be configured to receive a verification that a rescue worker is ready to handle the water hose 30, before controlling the valve arrangement 14 and the water pump 8 to discharge water from the external water source 20 via the second connection unit 10, 10" and the water hose 30.

The control device 100 may further be configured to control the robotic arm 60 to activate the external water source 20 and enable a water flow from the external water source 20 to the vehicle 1. The control device 100 may be configured to control the robotic arm 60 to actuate an actuator (not shown) of the external water source 20 in order to allow water to flow from the external water source 20.

The control device 100 may be configured to collect data relating to the emergency situation from the sensor devices 6; and control the vehicle 1 to perform the safety function based on the collected data. The control device 100 may be configured to collect data comprising the location/direction of the emergency situation, the distance to the emergency situation, temperature, water pressure, wind direction and/or wind force.

According to an example, the control device 100 is configured to select a tool 64 for performing the safety function and control the robotic arm 60 to connect with the tool 64. As an example, the control device 100 may comprise a list of predetermined emergency situations and corresponding predetermined tools 64 needed for safety functions in a database. The control device 100 may thus be configured to determine the current emergency situation and compare with the list to select a suitable tool 64. The control device 100 may be configured to select a tool 64 for performing the safety function based on data from the different sensor devices 6.

The control device 100 may be configured to, when the emergency situation relates to a fire, control the valve arrangement 14 and the water pump 8 to discharge water contained in the tank 40 in the vehicle 1 through a second outlet 19 of the vehicle 1 to extinguish the fire. The control device 100 may be configured to, when the emergency situation relates to a fire, control the valve arrangement 14 and the water pump 8 to discharge foaming agent contained in a tank 42 in the vehicle 1 through a second outlet 19 of the vehicle 1 to extinguish the fire. The control device 100 may be configured to determine, based on data from the sensor devices 6, that the water and/or foaming agent should be discharged by means of a water hose 30 connected to the at least one connection unit 10, 10', 10", 10'" or if water and/or foaming agent should be discharged by means of the water cannon 18.

The control device 100 may be configured to control the valve arrangement 14 and the water pump 8 to discharge water from an external water source 20 via a first outlet 16 and simultaneously discharge water and/or foaming agent from a tank 40, 42 on the vehicle 1 via a second outlet 19.

Figure 5:
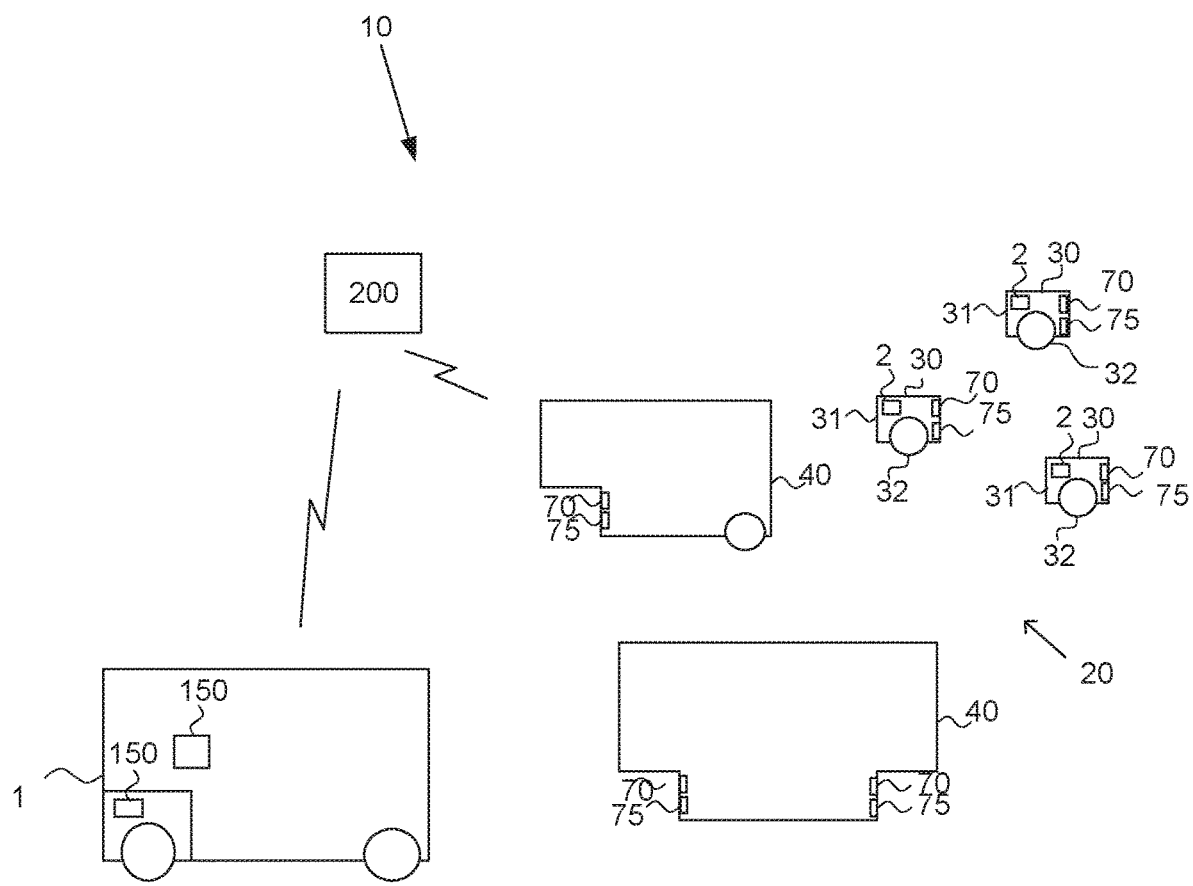
FIG. 5 schematically illustrate a system according to an example.

FIG. 5 schematically illustrates a system 10 associated with an emergency vehicle 1 according to an example. The system 10 relates to an emergency vehicle 1 as disclosed in FIG. 1, FIG. 2 or FIG. 3. In this example, the system 10 comprises an emergency vehicle 1 assembled from a set of modules 20 and a control center 200 arranged in communication with the assembled vehicle 1 and the set of modules 20. The system 10 thus comprises a control device 100 as disclosed in FIG. 4.

The set of modules 20 comprises a plurality of drive modules 30 and a plurality of functional modules 40. The emergency vehicle 1 comprises at least one drive module 30 and at least one functional module 40, wherein the at least one drive module 30 comprises a body 31, a pair of wheels 32 and a propulsion unit 2, and is configured to be autonomously operated and drive the emergency vehicle 1. Each module 30, 40 in the set of modules 20 comprise at least one interface 70 releasably connectable to a corresponding interface 70 on another module 30, 40. The modules 30, 40 suitably comprise at least one physical interface and at least one electrical interface.

The at least one drive module 30 and the functional module 40 of the emergency vehicle 1 may each comprise a control unit 150. The control device 100 may in this example comprise a plurality of control units 150 comprised in the different modules 30, 40.

In this example, the functional module 40 is configured to function as an emergency vehicle when being connected to the at least one drive module 30. The functional module 40 may thus comprise the water pump 8, the at least one connection unit 10, 10', 10", 10'", the conduits 12, the valve arrangement 14, the tanks 40, 42 and the robotic arm 60. The functional module 40 may also comprise the air compressor 43 and the reservoir 44 for accommodating compressed air. The energy storage unit 4 of the vehicle 1 may be comprised in the at least one drive module 30 or the functional module 40. The at least one propulsion unit 2 may be arranged in the at least one drive module 30. The sensor devices 6 arranged to monitor the surroundings and the vehicle 1 may be arranged on the at least one drive module 30 and/or the functional module 40.

The emergency vehicle 1 may comprise one drive module 30 or two drive modules 30, depending on the structural configuration of the functional module 40. Each drive module 30 may comprise a plurality of interfaces 70 for releasable connection with other modules 30, 40. The interface(s) 70 of the drive modules 30 may be arranged on different sides of the drive module 30 and thus enable connection with other modules 30, 40 on multiple sides of the drive module 30. The interfaces 70 on the drive modules 30 and the functional modules 40 respectively, are suitably arranged on corresponding positions to enable connection between the modules 30, 40. Each module 30, 40 comprise communication means for communication with another module 30, 40. The communication means may form part of the at least one interface 70 of each module 30, 40. The communication means of each module 30, 40 are controlled by the control units 150 of the module 30, 40. The communication means may comprise an internal communication network, such as CAN J1939, Flexray, Ethernet, fiber or similar. The communication means may additionally or alternatively comprise a transmitter and a receiver for wireless communication between the modules 30, 40. The communication means may be activated by means of controlling a switch, a contactor or similar. Each module 30, 40 may also comprise at least one sensor device 75 configured to sense when physical connection or disconnection between two modules 30, 40 has been performed.

Figure 6A:
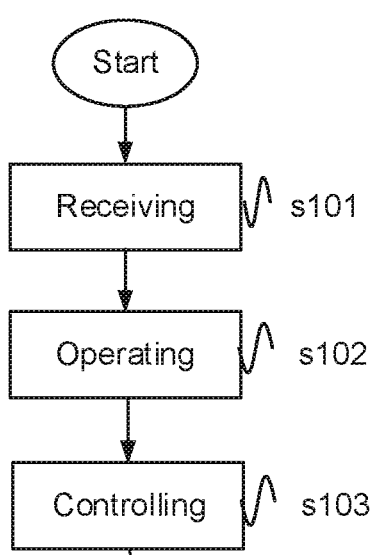
FIG. 6a-c illustrate flow charts for a method according to examples.

FIG. 6a illustrates a flow chart for a safety method, performed by a control device 100 of an emergency vehicle 1 according to an example. The emergency vehicle 1 may be configured as disclosed in FIG. 1, FIG. 2, FIG. 3 or FIG. 5. The method comprises: receiving s101 a command from a control center 200 to operate the vehicle 1 to a location associated with an occurring emergency situation; operating s102 the vehicle 1 to the location; and controlling s103 the vehicle 1 to perform a safety function to alleviate the emergency situation.

The step of controlling s103 the vehicle 1 to perform a safety function may comprise, when the emergency situation relates to a flood, controlling the valve arrangement 14 and the water pump 8 to suck water from the flood via a water hose 30 connected to the at least one connection unit 10, 10', 10", 10'". The command from the control center 200 may comprise information about the emergency situation relating to a flood. The method may comprise receiving a command from the control center 200 to suck water. The step of controlling s103 the vehicle 1 to perform a safety function may comprise detecting that a water hose 30 is connected to the at least one connection unit 10, 10', 10", 10'" before controlling the valve arrangement 14 and the water pump 8 to suck water.

Controlling s103 the vehicle 1 to perform a safety function may further comprise controlling the valve arrangement 14 to collect the sucked water in a tank 40 on the vehicle 1 or to discharge the sucked water externally to the vehicle 1. The method may comprise receiving a command from the control center 200 to collect the sucked water in a tank 40 or to discharge the sucked water externally of the vehicle 1. Controlling s103 the vehicle 1 to perform a safety function may comprise determining, based on the current volume of water in the tank 40, if the sucked water should be collected in the tank 40 or if it should be discharged externally of the vehicle 1. The control device 100 may determine the current water volume in the tank 40 based on data from a level gauge inside the tank 40 according to conventional methods.

The step of controlling s103 the vehicle 1 to perform a safety function may comprise autonomously connecting a water hose 30 to the at least one connection unit 10, 10', 10", 10'" by means of a robotic arm 60 on the vehicle 1. The method may thus comprise controlling the robotic arm 60 to grip the water hose 30 and connect one end of the water hose 30 with the at least one connection unit 10, 10', 10", 10'". The control device 100 may control the robotic arm 60 based on information from sensor devices 68 on the robotic arm 60 and sensor device 6 on the vehicle sides.

The step of controlling s103 the vehicle 1 to perform a safety function may comprise, when the emergency situation relates to a fire, controlling the valve arrangement 14 and the water pump 8 to discharge water from an external water source 20 connected to the at least one connection unit 10, 10', 10", 10'" through a first outlet 16 of the vehicle 1 to extinguish the fire. The command from the control center 200 may comprise information about the emergency situation relating to a fire. The command may comprise instructions to connect the at least one connection unit 10, 10', 10", 10'" with an external water source 20.

Controlling s103 the vehicle 1 to perform a safety function may comprise verifying that the external water source 20 is connected to the at least one connection unit 10, 10', 10", 10'" before controlling the valve arrangement 14 and the water pump 8 to discharge water from the external water source 20. Verifying that the external water source is connected to the at least one connection unit may comprise receiving signals from a sensor arranged at the at least one connection unit 10, 10', 10", 10'". The sensor may be configured to determine when an external water source 20 is connected to the at least one connection unit. Suitably, the sensor will send a signal to the control device 100 indicating correct connection between the external water source 20 and the at least one connection unit 10, 10', 10", 10'".

The step of controlling s103 the vehicle 1 to perform a safety function may comprise autonomously connecting the external water source 20 to the at least one connection unit 10, 10', 10", 10'" by means of the robotic arm 60. In the event that the external water source is positioned underground, the method may comprise controlling the robotic arm 60 to open a hatch in the ground to access the external water source 20. Controlling s103 the vehicle 1 to perform a safety function may further comprise controlling the vehicle 1 to a position where the at least one connection unit is aligned with the external water source 20. Controlling s103 the vehicle 1 to perform a safety function may further comprise controlling the robotic arm 60 to connect a coupling unit/adapter 66 and/or a connecting hose to the external water source 20, and connect the at least one connection unit 10, 10', 10", 10'" with the external water source 20 via the coupling unit/adapter 66 and/or the connection hose.

When the first outlet 16 comprises a water cannon 18, controlling s103 the vehicle 1 to perform a safety function may comprise controlling the water cannon 18 to discharge the water from the external water source 20. The control device 100 may receive a command from the control center 200 to discharge the water from the external water source 20 by means of the water cannon 18. Alternatively, the method comprises determining, based on data from the sensor devices 6, if the water from the external water source 20 should be discharged by means of the water cannon 18.

When the first outlet 16 comprises a second connection unit 10" connected to a water hose 30, controlling s103 the vehicle 1 to perform a safety function may comprise controlling the valve arrangement 14 and the water pump 8 to discharge water from the external water source 20 through the water hose 30. The control device 100 may receive a command from the control center 200 to discharge the water from the external water source 20 by means of the second connection unit 10″ and the water hose 30. Alternatively, the method comprises determining, based on data from the sensor devices 6, if the water from the external water source should be discharged by means of the water hose 30.

The step of controlling s103 the vehicle 1 to perform a safety function may comprise, when the emergency situation relates to a fire, controlling the robotic arm 60 on the vehicle 1 to activate the external water source 20 and thereby enable a water flow from the external water source 20 to the vehicle 1.

The step of controlling s103 the vehicle 1 to perform a safety function may further comprise selecting a tool 64 for performing the safety function; and controlling the robotic arm 60 to connect with the tool 64. The control device 100 may comprise a list of predetermined emergency situations and corresponding predetermined tools 64 needed for safety functions in a database. The control device 100 may thus determine the current emergency situation and compare with the list to select a suitable tool 64. The control device 100 may select a tool 64 for performing the safety function based on data from the different sensor devices 6.

The step of controlling s103 the vehicle 1 to perform a safety function may comprise, when the emergency situation relates to a fire, controlling the valve arrangement 14 and the water pump 8 to discharge water contained in a tank 40 in the vehicle 1 through a second outlet 19 of the vehicle 1 to extinguish the fire. The second outlet 19 may comprise the water cannon 18 or the second connection unit 10″. The step of controlling s103 the vehicle 1 to perform a safety function may comprise determining if the water from the tank 40 should be discharged via the second connection unit 10″ or the water cannon 18. Controlling s103 the vehicle 1 to perform a safety function may comprise autonomously connecting the water hose 30 to the second connection unit 10″ by means of the robotic arm 60.

Figure 6B:
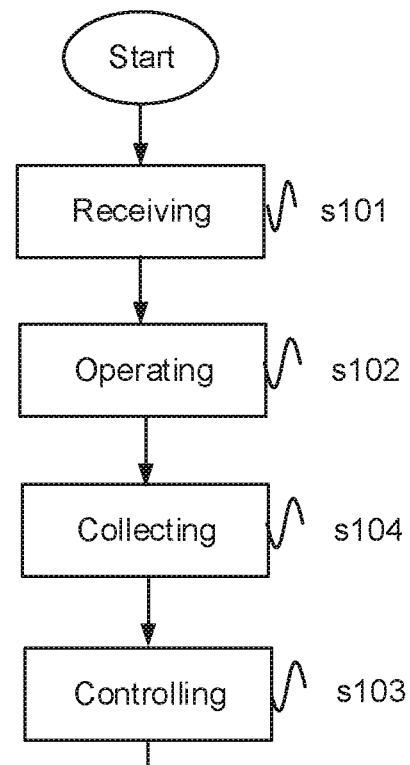

FIG. 6b illustrates a flow chart for a safety method, performed by a control device of an emergency vehicle 1 according to an example. The emergency vehicle 1 may be configured as disclosed in FIG. 1, FIG. 2, FIG. 3 or FIG. 5. The safety method comprises the steps as disclosed in FIG. 6a with the addition of the step of collecting s104 data relating to the emergency situation from the sensor devices 6, wherein the vehicle 1 is controlled s103 to perform the safety function based on the collected data. The collected data may comprise the location/direction of the emergency situation, the distance to the emergency situation, temperature, water pressure, wind direction and/or wind force. Collecting s104 data relating to the emergency situation from the sensor devices 6 may be performed before and/or simultaneously as controlling s103 the vehicle 1 to perform a safety function.

Figure 6C:
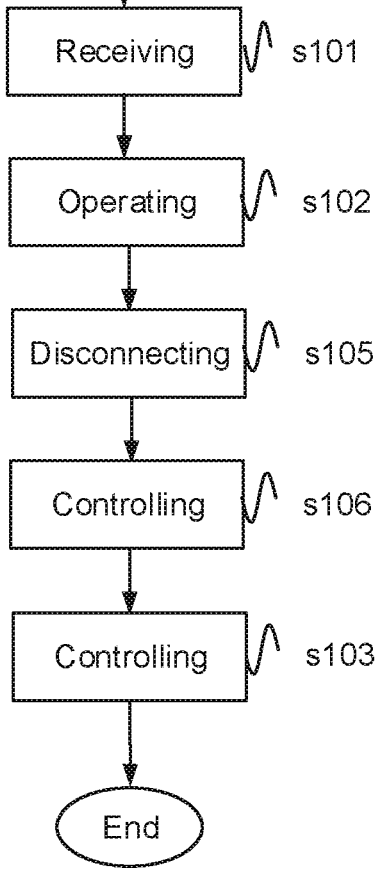

FIG. 6c illustrates a flow chart for a safety method, performed by a control device of an emergency vehicle 1 according to an example. The emergency vehicle 1 may be configured as disclosed in FIG. 5. Thus, in this example, the emergency vehicle 1 is assembled from a set of modules 20 and comprises at least one drive module 30 and a functional module 40. The safety method comprises the steps as disclosed in FIG. 6a. The method further comprises disconnecting s105 the at least one drive module 30 from the vehicle 1 at the location of the emergency situation; and controlling s106 the at least one drive module 30 to move away from the location of the emergency situation. This way, the functional module 40 will be left at the location of the emergency situation and will be controlled s103 to perform safety functions. In this example, the control device 100 may comprise a control unit 150 in the at least one drive module and a control unit 150 in the functional module 40. Disconnecting s105 the at least one drive module 30 from the vehicle 1 may comprise physically disconnecting the at least one drive module 30. Physically disconnecting the at least one drive module 30 may comprise controlling a physical interface 70 of the at least one drive module 30. Physically disconnecting the at least one drive module 30 may thus comprise controlling a coupling unit, a quick coupling, a hook or similar. Disconnecting s105 the at least one drive module 30 from the vehicle 1 may also comprise electrically disconnect the at least one drive module 30 from the vehicle 1. Electrically disconnecting the at least one drive module 30 may comprise inactivating communication means in the at least one drive module 30.

Figure 7:
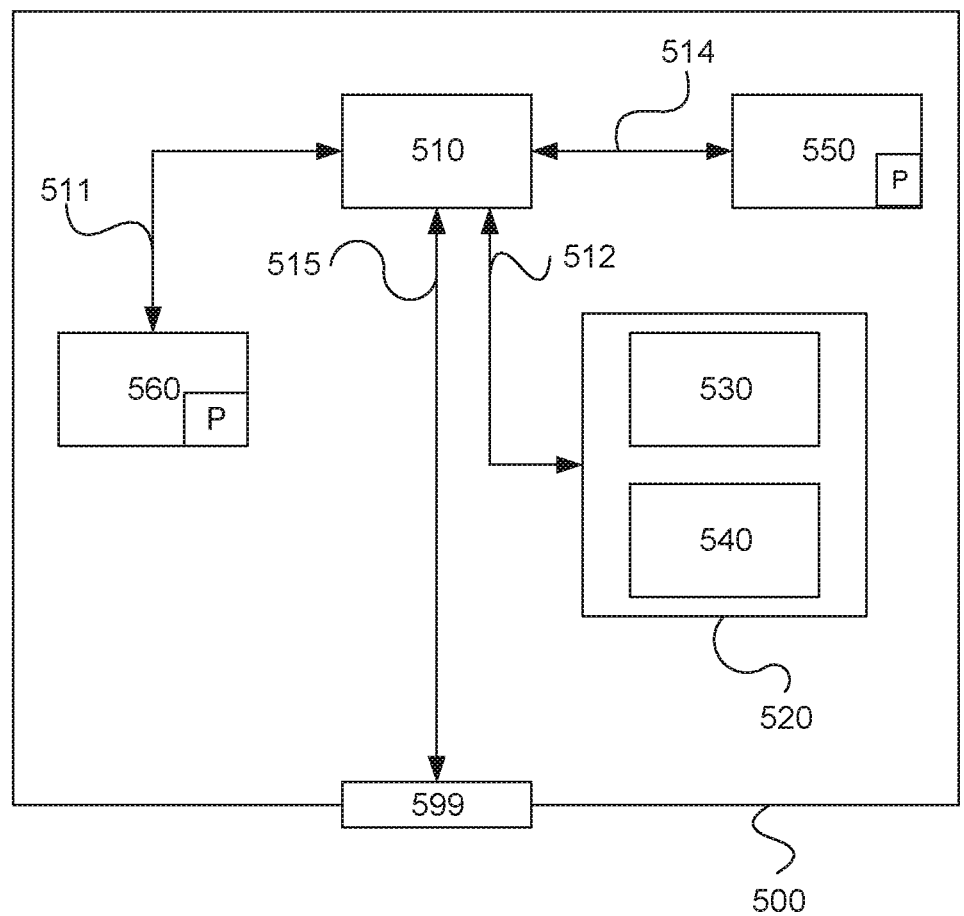
FIG. 7 schematically illustrates a control device or computer according to an example.

FIG. 7 is a diagram of a version of a device 500. The control device 100 and/or the control units 150 described with reference to FIG. 4 may in a version comprise the device 500. The device 500 comprises a non-volatile memory 520, a data processing unit 510 and a read/write memory 550. The non-volatile memory 520 has a first memory element 530 in which a computer programme, e.g. an operating system, is stored for controlling the function of the device 500. The device 500 further comprises a bus controller, a serial communication port, I/O means, an A/D converter, a time and date input and transfer unit, an event counter and an interruption controller (not depicted). The non-volatile memory 520 has also a second memory element 540.

There is provided a computer programme P which comprises routines for autonomously control an emergency vehicle to alleviate an emergency situation. The computer programme P further comprises routines for receiving a command from a control center to operate the vehicle to a location associated with an occurring emergency situation; operating the vehicle to the location; and controlling the vehicle to perform a safety function to alleviate the emergency situation. The programme P may be stored in an executable form or in a compressed form in a memory 560 and/or in a read/write memory 550.

Where the data processing unit 510 is described as performing a certain function, it means that the data processing unit 510 effects a certain part of the programme stored in the memory 560 or a certain part of the programme stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit 510 via a data bus 511. The read/write memory 550 is adapted to communicating with the data processing unit 510 via a data bus 514.

When data are received on the data port 599, they are stored temporarily in the second memory element 540. When input data received have been temporarily stored, the data processing unit 510 is prepared to effect code execution as described above.

Parts of the methods herein described may be effected by the device 500 by means of the data processing unit 510, which runs the programme stored in the memory 560 or the read/write memory 550. When the device 500 runs the programme, methods herein described are executed.

The foregoing description of the preferred embodiments of the present invention is provided for illustrative and descriptive purposes. It is not intended to be exhaustive or to restrict the invention to the variants described. Many modifications and variations will obviously be apparent to one skilled in the art. The embodiments have been chosen and described in order best to explain the principles of the invention and its practical applications and hence make it possible for specialists to understand the invention for various embodiments and with the various modifications appropriate to the intended use.

The invention claimed is:

1. A safety method, performed by a control device of an emergency vehicle, the emergency vehicle being configured to be autonomously operated by means of the control device and comprising:
    a functional module;
    at least one drive module connected to the functional module, wherein the at least one drive module comprises a pair of wheels and a propulsion unit and is configured to be autonomously operated and drive the vehicle;
    an energy storage unit arranged to supply power for propulsion of the vehicle and/or for performing safety functions;
    sensor devices arranged to monitor a surroundings and the vehicle;
    a water pump;
    at least one connection unit for an external water source and/or a water hose;
    conduits arranged in fluid communication with the water pump and/or the at least one connection unit; and
    a valve arrangement arranged in fluid communication with the water pump, the at least one connection unit, and the conduits, wherein the valve arrangement is configured to regulate a flow and/or a pressure in the conduits and the at least one connection unit,
    the method comprising:
        receiving a command from a control center to operate the vehicle to a location associated with an occurring emergency situation;
        operating he vehicle to the location; and
        controlling the vehicle to perform a safety function to alleviate the emergency situation.

2. The method according to claim 1, wherein, when the emergency situation relates to a flood, the step of controlling the vehicle to perform a safety function comprises controlling the valve arrangement and the water pump to suck water from the flood via a water hose connected to the at least one connection unit.

3. The method according to claim 2, wherein the step of controlling the vehicle to perform a safety function comprises autonomously connecting the water hose to the at least one connection unit by means of a robotic arm on the vehicle.

4. The method according to claim 3, wherein the step of controlling the vehicle to perform a safety function comprises: selecting a tool for performing the safety function; and controlling the robotic arm to connect with the tool.

5. The method according to claim 2, wherein the step of controlling the vehicle to perform a safety function further comprises controlling the valve arrangement to collect the sucked water in a tank on the vehicle or to discharge the sucked water externally to the vehicle.

6. The method according to claim 1, wherein, when the emergency situation relates to a fire, the step of controlling the vehicle to perform a safety function comprises controlling the valve arrangement and the water pump to discharge water from an external water source connected to the at least one connection unit through a first outlet of the vehicle.

7. The method according to claim 6, wherein the step of controlling the vehicle to perform a safety function comprises autonomously connecting the external water source to the at least one connection unit by means of a robotic arm on the vehicle.

8. The method according to claim 6, wherein the first outlet comprises a water cannon and wherein controlling the vehicle to perform a safety function comprises controlling the water cannon to discharge water.

9. The method according to claim 6, wherein the first outlet comprises a second connection unit connected to a water hose, and wherein controlling the vehicle to perform a safety function comprises controlling the valve arrangement and the water pump to discharge water through the water hose.

10. The method according to claim 6, wherein the step of controlling the vehicle to perform a safety function comprises controlling a robotic arm on the vehicle to activate the external water source to enable a water flow from the external water source to the vehicle.

11. The method according to claim 1, wherein the method further comprises:
    collecting data relating to the emergency situation from the sensor devices,
    wherein controlling the vehicle to perform a safety function is performed based on the collected data.

12. The method according to claim 11, wherein the collected data may comprise the location/direction of the emergency situation, a distance to the emergency situation, a temperature, a water pressure, a wind direction, and/or a wind force.

13. The method according to claim 1, wherein, when the emergency situation relates to a fire, the step of controlling the vehicle to perform a safety function comprises controlling the valve arrangement and the water pump to discharge water contained in a tank in the vehicle through a second outlet of the vehicle.

14. A computer program product comprising computer program code stored on a non-transitory computer-readable medium, said computer program product used for use with an emergency vehicle, the emergency vehicle being configured to be autonomously and comprising: a functional module; at least one drive module connected to the functional module, wherein the at least one drive module comprises a pair of wheels and a propulsion unit and is configured to be autonomously operated and drive the vehicle; an energy storage unit arranged to supply power for propulsion of the vehicle and/or for performing safety functions; sensor devices arranged to monitor a surroundings and the vehicle; a water pump; at least one connection unit for an external water source and/or a water hose; conduits arranged in fluid communication with the water pump and/or the at least one connection unit; and a valve arrangement arranged in fluid communication with the water pump, the at least one connection unit, and the conduits, wherein the valve arrangement is configured to regulate a flow and/or a pressure in the conduits and the at least one connection unit, said computer program code comprising computer instructions to cause one or more control devices to perform the following operations:
    receiving a command from a control center to operate the vehicle to a location associated with an occurring emergency situation;
    operating the vehicle to the location; and
    controlling the vehicle to perform a safety function to alleviate the emergency situation.

15. A control device of an emergency vehicle, the control device being configured to autonomously operate the emergency vehicle, the emergency vehicle comprising: a functional module; at least one drive module connected to the functional module, wherein the at least one drive module comprises a pair of wheels and a propulsion unit and is configured to be autonomously operated and drive the vehicle; an energy storage unit arranged to supply power for propulsion of the vehicle and/or for performing safety functions; sensor devices arranged to monitor the surroundings and the vehicle; a water pump; at least one connection unit for an external water source and/or a water hose; conduits arranged in fluid communication with the water pump and/or the at least one connection unit; and a valve arrangement arranged in fluid communication with the water pump, the at least one connection unit and the conduits; wherein the valve arrangement is configured to regulate the flow and/or pressure in the conduits and the at least one connection unit, the control device configured to:
  receive a command from a control center to operate the vehicle to a location associated with an occurring emergency situation;
  operate the vehicle to the location; and
  control the vehicle to perform a safety function to alleviate the emergency situation.

16. The control device according to claim 15, wherein the control device is configured to, when the emergency situation relates to a flood, control the valve arrangement and the water pump to suck water from the flood via a water hose connected to the at least one connection unit.

17. The control device according to claim 16, wherein the control device is configured to control a robotic arm on the vehicle to autonomously connect the water hose to the at least one connection unit.

18. The control device according to claim 17, wherein the control device is configured to select a tool for performing the safety function and control the robotic arm to connect with the tool.

19. The control device according to claim 16, wherein the control device is further configured to control the valve arrangement to collect the water in a tank on the vehicle or to discharge the sucked water externally to the vehicle.

20. The control device according to claim 15, wherein the control device is configured to, when the emergency situation relates to a fire, control the valve arrangement and the water pump to discharge water from an external water source connected to the at least one connection unit through a first outlet of the vehicle.

21. The control device according to claim 20, wherein the control device is configured to control a robotic arm on the vehicle to autonomously connect the external water source to the at least one connection unit.

22. The control device according to claim 20, wherein the first outlet comprises a water cannon and wherein the control device is configured to control the water cannon to discharge the water from the external water source.

23. The control device according to claim 20, wherein the first outlet comprises a second connection unit connected to a water hose, and wherein the control device is configured to control the valve arrangement and the water pump to discharge water through the second connection unit and the water hose.

24. The control device according to claim 20, wherein the control device is configured to control a robotic arm on the vehicle to activate the external water source to enable a water flow from the external water source to the vehicle.

25. The control device according to claim 15, wherein the control device is configured to: collect data relating to the emergency situation from the sensor devices; and control the vehicle to perform the safety function based on the collected data.

26. The control device according to claim 15, wherein the control device is configured to, when the emergency situation relates to a fire, control the valve arrangement and the water pump to discharge water contained in a tank in the vehicle through a second outlet of the vehicle.

27. The control device according to claim 15, wherein the control device is a general electronic processor performing operations by running computer program code stored on a non-transitory computer-readable medium associated with the control device.

28. An emergency vehicle configured to be autonomously operated, the vehicle comprising:
  a functional module;
  at least one drive module connected to the functional module,
  wherein the at least one drive module comprises a pair of wheels and a propulsion unit and is configured to be autonomously operated and drive the vehicle; and
  an energy storage unit arranged to supply power for propulsion of the vehicle and/or for performing safety functions;
  sensor devices arranged to monitor the surroundings and the vehicle;
  a water pump;
  at least one connection unit for an external water source and/or a water hose;
  conduits arranged in fluid communication with the water pump and/or the at least one connection unit;
  a valve arrangement arranged in fluid communication with the water pump, the at least one connection unit and the conduits, wherein the valve arrangement is configured to regulate a flow of water and/or a pressure in the conduits and the at least one connection unit; and
  at least one control device configured to:
    receive a command from a control center to operate the vehicle to a location associated with an occurring emergency situation;
    operate the vehicle to the location; and
    control the vehicle to perform a safety function to alleviate the emergency situation.

29. The emergency vehicle according to claim 28, wherein the at least one control device is configured to disconnect the at least one drive module from the vehicle at the location of the emergency situation, and control the at least one drive module to move away from the location of the emergency situation.

30. The emergency vehicle according to claim 28, wherein the one or more control devices is a general electronic processor performing operations by running computer program code stored on a non-transitory computer-readable medium associated with the one or more control devices.

31. A safety method, performed by a control device of an emergency vehicle, the emergency vehicle being configured to be autonomously operated by means of the control device and comprising:
  an energy storage unit arranged to supply power for propulsion of the vehicle and/or for performing safety functions;
  sensor devices arranged to monitor a surroundings and the vehicle;
  a water pump;

at least one connection unit for an external water source and/or a water hose;

conduits arranged in fluid communication with the water pump and/or the at least one connection unit;

a valve arrangement arranged in fluid communication with the water pump, the at least one connection unit, and the conduits, wherein the valve arrangement is configured to regulate a flow and/or a pressure in the conduits and the at least one connection unit; and a robotic arm, the method comprising:
  receiving a command from a control center to operate the vehicle to a location associated with an occurring emergency situation;
  operating he vehicle to the location; and
controlling the vehicle to perform a safety function to alleviate the emergency situation, controlling the vehicle to perform a safety function comprising selecting a tool for performing the safety function; and controlling the robotic arm to connect with the tool.

32. An emergency vehicle configured to be autonomously operated, the vehicle comprising:
  an energy storage unit arranged to supply power for propulsion of the vehicle and/or for performing safety functions;
  sensor devices arranged to monitor the surroundings and the vehicle;
  a water pump;
  at least one connection unit for an external water source and/or a water hose;
  conduits arranged in fluid communication with the water pump and/or the at least one connection unit;
  a valve arrangement arranged in fluid communication with the water pump, the at least one connection unit and the conduits, wherein the valve arrangement is configured to regulate a flow of water and/or a pressure in the conduits and the at least one connection unit;
  a robotic arm; and
  at least one control device configured to:
    receive a command from a control center to operate the vehicle to a location associated with an occurring emergency situation;
    operate the vehicle to the location; and
    control the vehicle to perform a safety function to alleviate the emergency situation, controlling the vehicle to perform a safety function comprising selecting a tool for performing the safety function; and controlling the robotic arm to connect with the tool.

* * * * *